ns Patent Office 3,560,517
Patented Feb. 2, 1971

3,560,517
ISOXAZOLIDINE CARBOXANILIDES
Hans Grabinger, Richard Sehring, and Karl Zeile, Ingelheim am Rhein, Germany, assignors to C. H. Sohn Boehringer, Ingelheim am Rhein, Germany
No Drawing. Filed Dec. 6, 1967, Ser. No. 688,319
Claims priority, application Germany, Dec. 6, 1966, B 90,229; May 19, 1967, B 92,616; May 23, 1967, B 92,677
Int. Cl. C07d 85/08, 87/04
U.S. Cl. 260—307  6 Claims

ABSTRACT OF THE DISCLOSURE

Novel urea derivatives of the formula

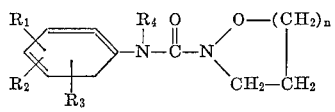

(I)

wherein $R_1$ and $R_2$ are selected from the group consisting of hydrogen, halogen, lower alkyl, lower alkoxy and lower alkylthio of 1 to 5 carbon atoms, trifluoromethyl and aryloxy which may be substituted with a substituent selected from the group consisting of halogen and alkylthio of 1 to 5 carbon atoms, $R_3$ is selected from the group consisting of hydrogen, halogen, lower alkyl, lower alkoxy and lower alkylthio of 1 to 5 carbon atoms and aryloxy which may contain substituents selected from the group consisting of halogen and alkylthio of 1 to 5 carbon atoms, $R_4$ is selected from the group consisting of hydrogen and alkyl of 1 to 5 carbon atoms and $n$ is an integer from 1 to 2 which compounds possess herbicidal activity.

OBJECTS OF THE INVENTION

It is an object of the invention to provide the novel urea compounds of Formula I.

It is another object of the invention to provide novel herbicidal compositions.

It is a further object of the invention to provide a novel method of killing broad-leaf weeds and grasses.

These and other objects and advantages of the invention will become obvious from the following detailed description.

THE INVENTION

The novel urea compounds of the invention are isoxazolidines and tetrahydro-1,2-isoxazines of the formula

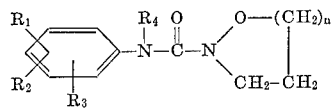

wherein $R_1$ and $R_2$ are selected from the group consisting of hydrogen, halogen, lower alkyl, lower alkoxy and lower alkylthio of 1 to 5 carbon atoms, trifluoromethyl and aryloxy which may be substituted with a substituent selected from the group consisting of halogen and alkylthio of 1 to 5 carbon atoms, $R_3$ is selected from the group consisting of hydrogen, halogen, lower alkyl, lower alkoxy and lower alkylthio of 1 to 5 carbon atoms and aryloxy which may contain substituents selected from the group consisting of halogen and alkylthio of 1 to 5 carbon atoms, $R_4$ is selected from the group consisting of hydrogen and alkyl of 1 to 5 carbon atoms and $n$ is an integer from 1 to 2.

The compounds of the invention may be produced by a variety of known reactions some of which are illustrated as follows:

(A) Reaction of a compound of the formula

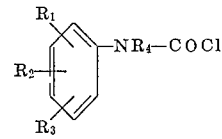

(II)

with a compound of the formula

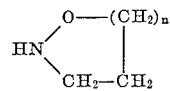

(III)

(B) Reaction of a compound of the formula

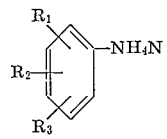

(IV)

with a compound of the formula

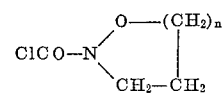

(V)

(C) When $R_4$ is hydrogen, a compound of the formula

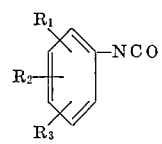

(VI)

is reacted with a compound of Formula III.

(D) For the production of compounds having $R_1$ in the 3-position of the phenyl and a chlorine, bromine or iodine atom in the 4-position of the phenyl, a compound of the formula

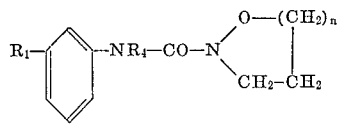

(VII)

is reacted with chlorine, bromine or iodine chloride.

Reactions A to C are preferably carried out at room temperature. Inert organic solvents immiscible with water such as ether, benzene, methylenechloride are suitable reaction media. The starting compounds are known or are produced according to conventional processes, for example by reaction of the corresponding amino compounds with phosgene.

The herbicidal compositions are comprised of a herbicidally effective amount of at least one urea compound of Formula I and a major amount of a herbicidally inert carrier. The carrier may be a solid or liquid in standard forms such as dusting powders, wettable powders, emulsions, suspensions, etc. optionally containing emulsifiers, wetting agents, adhesion agents, etc. The compositions usually contain 0.01 to 5.0% by weight of the active ingredient.

The novel method of killing weeds comprises contacting the weeds with a herbicidally effective amount of at least one compound of Formua I. The usual herbicidally effective amount of the active ingredient is 1 to 2 kg./ha. although larger amounts may be used. The compounds of the invention have an excellent herbicidal activity against broad-leaf weeds and grasses, for instance against wild oats (*Avena futua*), charlock (*Sinapis avensis*), pale persicaria (*Polygonum persicaria*) and related types of stinging nettles (*Urtica urens*), common chickweed (*Stellaria media*).

In the following examples there are described several preferred embodiments to illustrate the invention. However, it should be understood that the invention is to be limited only as defined in the appended claims.

EXAMPLE I

Preparation of 2-(4-methylthio-anilinocarbonyl)-isoxazolidine 55 g. (0.5 mol) of isoxazolindine hydrochloride were dissolved in 300 ml. of water and the resulting solution was neutralized with 27 g. of sodium carbonate. 500 ml. of methylene chloride were added to this solution and then, while stirring, a solution of 82.5 g. (0.5 mol) of 4-methylthio-phenylisocyanate in 500 ml. of methylene chloride were added at a reaction temperature of 20° C. Then the reaction mixture was stirred for 12 hours at 20° C. The precipitate that originated in small quantity was filtered off and the layer of methylene chloride was separated. The methylene chloride solution was evaporated to dryness and the residue was recrystallized from benzene to obtain 100 g. (84.2% yield) of 2-(4-methylthio-anilinocarbonyl)-isoxazolidine having a melting point of 120–121° C.

EXAMPLE II

Preparation of 2-(3-chloro-anilinocarbonyl)-isoxazolidine 82.5 g. (0.75 mol) of isoxazolidine hydrochloride were dissolved in 500 ml. of water and the resulting solution was neutralized with 40 g. of sodium carbonate. 750 ml. of methylene chloride were added to this solution and, while stirring vigorously, a solution of 115 g. (0.75 mol) of 3-chlorophenyl isocyanate in 750 ml. of methylene chloride was added at a reaction temperature of 20° C. Then, the reaction mixture was stirred for 12 hours at 20° C. and the precipitate originating in a small quantity was filtered off and the methylene chloride layer was separated. The methylene chloride solution was evaporated to dryness and the residue was recrystallized from benzene to obtain 145 g. (85.2% yield) of 2-(3-chloro-anilinocarbonyl)-isoxazolidine having a melting point of 76–78° C.

EXAMPLE III

Using the procedure of Example II, there was obtained 2-(4-chloro-anilinocarbonyl)-isoxazolidine having a melting point of 71–72° C.

EXAMPLE IV

Using the procedure of Example II, there was obtained 2-(4-bromo-anilinocarbonyl)-isoxazolidine having a melting point of 77–79° C.

EXAMPLE V

Using the procedure of Example II, there was obtained 2-(3,4-dichloro-anilinocarbonyl)-isoxazolidine having a melting point of 78–79° C.

EXAMPLE VI

Using the procedure of Example II, there was obtained 2-(2-methylthio-4,5 - dichloro - anilinocarbonyl)-isoxazolidine having a melting point of 146–149° C.

EXAMPLE VII

Using the procedure of Example II, there was obtained 2-(3-chloro-4-bromo-anilinocarbonyl)-isoxazolidine having a melting point of 85–86° C.

EXAMPLE VIII

Using the procedure of Example II, there was obtained 2-(3 - chloro-4-iodo-anilinocarbonyl)-isoxazolidine having a melting point of 125–126° C. (decomposition).

EXAMPLE IX

Preparation of 2-(3-chloro-4-bromo-anilinocarbonyl)-isoxazolidine 227 g. (1 mol) of 2-(3-chloro-anilinocarbonyl)-isoxazolidine were dissolved in 800 ml. of glacial acetic acid and then 82 g. of sodium acetate were added thereto. A solution of 160 g. of bromine in 300 ml. of glacial acetic acid was dropped into the solution at 20 to 25° C. in approximately one hour. Then, the solution was heated to 30 to 35° C. for two hours and allowed to stand over night. The reaction mixture was stirred into 6 liters of ice water and then was extracted with methylene chloride. The extract was washed with dilute sodium hydroxide solution and water and then evaporated to dryness to obtain after recrystallization from isopropanol 260 g. (85% yield) of 2-(3-chloro-4-bromo-anilinocarbonyl)-isoxazolidine having a melting point of 85–86° C.

EXAMPLE X

Using the procedure of Example IX, 2-(3-chloro-anilinocarbonyl)-isoxazolidine is reacted with iodine chloride in the presence of glacial acetic acid to obtain after recrystallization from ethyl acetate 265 g. (75% yield) of 2-(3-chloro-4-iodo-anilinocarbonyl)-isoxazolidine having a melting point of 125–126° C. (decomposition).

EXAMPLE XI

Preparation of 2-anilinocarbonyl-tetrahydro-1,2-isoxazine

An aqueous solution of 124 g. (1 mol) of tetrahydro-1,2-isoxazine hydrochloride in 400 ml. of water was neutralized with approximately 53 g. of sodium carbonate and a solution of 119 g. (1 mol) of phenyl isocyanate in 500 ml. of methylene chloride was added dropwise thereto over about 10 minutes with stirring. The solution was then stirred at 20° C. for 8 hours and the organic phase was then separated and the organic solvent was distilled off. The 175 g. of dry residue consisted of almost pure product. After recrystallization from 400 ml. of isopropanol, there was obtained an 85% yield of 2-anilinocarbonyl-tetrahydro-1,2-isoxazine having a melting point of 105–106° C.

EXAMPLE XII

Using the process of Example XI, an aqueous solution of 124 g. of tetrahydro-1,2-isoxazine hydrochloride in 400 ml. of water was neutralized and a solution of 153.5 g. (1 mol) of p-chlorophenyl isocyanate in 500 ml. of toluene was dropwise added thereto over about 10 minutes with stirring. The solution was then stirred for 8 hours at 20° C. and the organic phase was then separated and evaporated to dryness to obtain 216 g. (90% yield) of 2 - (4 - chloro-anilinocarbonyl)-tetrahydro-1,2-isoxazine which when recrystallized from 350 ml. of cyclohexane had a melting point of 104–105° C.

EXAMPLE XIII

Using the procedure of Example XII, there was obtained 2 - (3,4-dichloro-anilinocarbonyl)-tetrahydro-1,2-isoxazine having a melting point of 109—110° C.

EXAMPLE XIV

Using the procedure of Example XII, there was obtained 2-(b-n-butoxy-anilinocarbonyl)-tetrahydro-1,2-isoxazine having a melting point of 90–92° C.

EXAMPLE XV

Using the procedure of Example XII, there was obtained 2-(4-methyl-anilinocarbonyl)-tetrahydro-1,2-isoxazine having a melting point of 92–94° C.

EXAMPLE XVI

Using the procedure of Example XII, there was obtained 2-(4-bromo-anilinocarbonyl)-tetrahydro-1,2-isoxazine having a melting point of 123–124° C.

EXAMPLE XVII

Using the procedure of Example XII, there was obtained 2 - (3-trifluoromethyl-anilinocarbonyl)-tetrahydro-1,2-isoxazine having a melting point of 116—119° C.

EXAMPLE XVIII

Using the procedure of Example XII, there was obtained 2 - (3,5 - ditrifluoromethyl-anilinocarbonyl)-tetrahydro-1,2-isoxazine having a melting point of 108–111° C.

EXAMPLE XIX

Preparation of 2-anilinocarbonyl-isoxazolidine 110 g. (1 mol) of isoxazolidine hydrochloride were dissolved in 500 ml. of water and the solution was neutralized with 53 g. of sodium carbonate. A solution of 119 g. (1 mol) of phenyl isocyanate in 500 ml. of methylene chloride was added thereto dropwise while stirring at 20° C. over a period of about 20 minutes. The stirring was continued for 4 hours and the crystalline impurity formed was filtered off. The organic solution was evaporated to dryness and the residue was crystallized from hot benzene to obtain 160 g. (83.2% yield) of 2-anilinocarbonyl-isoazolidine.

EXAMPLE XX

Using the procedure of Example XIX, an aqueous solution of 1 mol of isoxazolidine was added dropwise over a period of 30 minutes with stirring to a solution of 133 g. (1 mol) of toluene isocyanate in 750 ml. of methylene chloride with cooling. The solution was then stirred for 4 to 5 hours and the small amount of byproduct was filtered off. The organic solution was evaporated to dryness and the residue was crystallized from benzene to obtain 187 g. (91% yield) of 2-(4-methyl-anilinocarbonyl)-isoxazolidine having a melting point of 66–67° C.

EXAMPLE XXI

Preparation of 2-(3-trifluoromethyl-anilinocarbonyl)-isoxazolidine

A solution of 136 g. (1 mol) of 2-(chloro-carbonyl)-1,2-isoxazolidine in 500 ml. of absolute benzene was added dropwise at 20–35° C. over 30 minutes with stirring to a solution of 322 g. (2 mols) of 3-trifluoromethyl-aniline. Stirring was continued for 3 hours more at 20° C. and the precipitate of trifluoromethylaniline hydrochloride was filtered off. The filtrate was evaporated to dryness and the residue was crystallized from isopropanol to obtain 220 g. (85% yield) of 2-(3-trifluoromethyl-anilinocarbonyl)-isoxazolidine having a melting point of 88–91° C.

EXAMPLE XXII

Using the procedure of Example XXI, there was obtained 2 - (4-[4-chlorophenoxy]-anilinocarbonyl)-isoxazolidine.

EXAMPLE XXIII

Using the procedure of Example XXI, there was obtained 2-(4-methylthio-anilinocarbonyl)-isoxazolidine.

EXAMPLE XXIV

Using the procedure of Example XXI, there was obtained 2 - (3 - chloro-4-bromo-anilinocarbonyl)-isoxazolidine.

EXAMPLE XXV

Using the procedure of Example XXI, there was obtained 2-(3-chloro-4-iodo-anilinocarbonyl)-isoxazolidine.

EXAMPLE XXVI

Preparation of 2-(3,5-ditrifluoromethyl-anilinocarbonyl)-isoxazolidine

Into a solution prepared analogous to Example XIX of 110 g. (1 mol) of isoxazolidine there was added dropwise over approximately 30 minutes a solution of 229 g. (1 mol) of 3,5-ditrifluoromethylphenyl-isocyanate in 750 ml. of methylene chloride at 20° C. Stirring was continued for 4–5 hours and then the organic phase was evaporated to dryness and the residue was recrystallized from benzene to obtain 269 g. (82% yield) of 2-(3,5-ditrifluoromethyl-anilinocarbonyl)-isoxazolidine having a melting point of 116–118° C.

HERBIDICAL COMPOSITION EXAMPLES

Example A—Emulsion

An emulsion concentrate, which is diluted with water up to a concentration of 15% of active ingredient before application, is obtained by mixing of 20 parts by weight of the active ingredient of Example I with 50 parts by weight of a mixture of aliphatic and aromatic hydrocarbons, 20 parts by weight of cyclohexanones and 10 parts by weight of a conventional emulsifier.

Example B—Wettable powder

A wettable powder is obtained by admixing 20 parts by weight of the active ingredient of Example II, 20 parts by weight of kaolin P, 43 parts by weight of siliceous chalk, 5 parts by weight of sodium sulfate, 2 parts by weight of prepared chalk, 1 part by weight of wetting agent and 9 parts by weight of a conventional stabilizer.

Example C—Dusting powder

A dusting powder is obtained by admixing 1.5 parts by weight of the active ingredient of Example III, 6 parts by weight of kaolin P and 92.5 parts by weight of talcum.

Various modifications of the products and method of the invention may be made without departing from the spirit or scope thereof and it is to be understood that the invention is to be limited only as defined in the appended claims.

We claim:

1. A compound of the formula

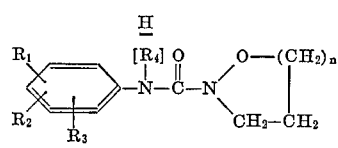

wherein $R_1$ and $R_2$ are selected from the group consisting of hydrogen, halogen, lower alkyl, lower alkoxy and lower alkylthio of 1 to 5 carbon atoms, trifluoromethyl and phenoxy which may be substituted with chlorine, $R_3$ is selected from the group consisting of hydrogen and halogen and $n$ is 1.

2. A compound of claim 1 wherein $R_1$, $R_2$ and $R_3$ are selected from the group consisting of hydrogen and halogen, at least one of said Rs being halogen.

3. A compound of claim 1 wherein the compound is 2-(3-chloro-anilinocarbonyl)-isoxazolidine.

4. A compound of claim 1 wherein the compound is 2-(3,4-dichloro-anilinocarbonyl)-isoxazolidine.

5. A compound of claim 1 wherein the compound is 2-(3-chloro-4-bromo-anilinocarbonyl)-isoxazolidine.

6. A compound of claim 1 wherein the compound is 2-(3-chloro-4-iodo-anilinocarbonyl)-isoxazolidine.

References Cited

King, Chemical Abstracts, vol. 36, col. 6539 (1942).
Wichterle et al., Chemical Abstracts, vol. 45, cols. 3849–3850 (1951).

ALTON D. ROLLINS, Primary Examiner

U.S. Cl. X.R.

71—88; 260—244, 453, 544, 575, 578